UNITED STATES PATENT OFFICE.

PAUL RALPH HERSHMAN, OF CHICAGO, ILLINOIS, ASSIGNOR TO ARMOUR FERTILIZER WORKS, OF CHICAGO, ILLINOIS, A CORPORATION OF NEW JERSEY.

METHOD OF PRODUCING NITROGENOUS COMPOUNDS FROM ALUMINUM WASTE PRODUCTS.

1,188,769.      Specification of Letters Patent.      Patented June 27, 1916.

No Drawing.      Application filed November 25, 1913. Serial No. 803,007.

*To all whom it may concern:*

Be it known that I, PAUL RALPH HERSHMAN, a citizen of Austria-Hungary, residing at Chicago, in the county of Cook and State of Illinois, have invented certain new and useful Improvements in Methods of Producing Nitrogenous Compounds from Aluminum Waste Products, of which the following is a specification.

One of the leading purposes and salient features of this invention is the production of nitrogenous compounds, such for example, as the nitrogenous compounds of aluminum, whereby to obtain an acceleration or hastening of the combination of the nitrogen, and also to provide a method for accomplishing this result, which shall be economical in its execution.

A preferred manner of carrying out this process or method may be stated as follows: The skimmings obtained as a commercial by-product from the smelting of aluminum and its alloys, are powdered, and the aluminum carbids contained therein are separated out by an air process, taking advantage of their different specific gravity. This separation may be readily accomplished by the employment of air currents and sieves in a manner used in analogous arts, and which does not need specific description here. The carbids are then mixed with a small amount of a catalytic agent (say one-tenth to one per cent.), capable of combining with nitrogen. As an example of such catalytic agent I may mention boron, titanium, or any of their compounds, susceptible to reduction by carbon. It is also of advantage to add from two to five per cent. of carboniferous matter, which by decomposition forms minutely divided carbon, and from one to two per cent. of calcium oxid, which serves to destroy the carbon monoxid formed in the process and which is very injurious to the formation of the nitrogenous compounds.

Taking $CH_4$ as a type of carboniferous matter, this reaction may be expressed as follows:

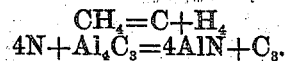

Some calcium carbid is formed in the beginning of the process and is reconverted into oxid by the carbon monoxid produced at higher temperatures. Nitrogen is passed through this mixture while the latter is heated to from approximately 1700° to 1800° centigrade, preferably in an electric resistance furnace. The mass formed contains from 15% to 20% nitrogen.

While I have herein set forth with some degree of particularity the ingredients employed, the percentages used, and the reactions occurring, I do not wish to be limited exactly to these details, because various minor changes may be made in the processes without departure from the invention and without sacrificing any of its substantial advantages.

I claim:

1. The method of producing nitrogenous compounds, which consists in heating in the presence of nitrogen at a temperature of approximately 1700° to 1800° centigrade, a mixture of aluminum carbid, and from approximately one-tenth to one per cent. of a catalytic agent, substantially as described.

2. The method of producing nitrogenous compounds of aluminum, which consists in heating in the presence of nitrogen at a temperature from approximately 1700° to 1800° centigrade, a mixture of aluminum carbid, from approximately one-tenth to one per cent. of a catalytic agent, and from approximately two to five per cent. of carboniferous matter, substantially as described.

3. The method of producing nitrogenous compounds of aluminum, which consists in heating in the presence of nitrogen, a mixture of aluminum carbid, a catalytic agent capable of combining with nitrogen, and calcium oxid, substantially as described.

4. The method of producing nitrogenous compounds of aluminum, which consists in heating in the presence of nitrogen a mixture of aluminum carbid, from approximately one-tenth to one per cent. of a catalytic agent capable of combining with nitrogen, and from approximately one to two per cent. of calcium oxid, substantially as described.

5. The method of producing nitrogenous compounds of aluminum, which consists in heating in the presence of nitrogen, a mixture of aluminum carbid, a catalytic agent capable of combining with nitrogen, carboniferous matter, and calcium oxid, substantially as described.

6. The method of producing nitrogenous compounds of aluminum, which consists in heating at approximately 1700° to 1800° centigrade, in the presence of nitrogen, a mixture of aluminum carbid, from approximately one-tenth to one per cent. of a catalytic agent capable of combining with nitrogen, from approximately two to five per cent. of carboniferous matter, and from substantially one to two per cent. of calcium oxid, substantially as described.

Dr. PAUL RALPH HERSHMAN.

Witnesses:
Geo. T. Dale,
Waldemar Sill.